Dec. 10, 1940.   R. M. HICKS   2,224,244
METHOD OF AND APPARATUS FOR RECORDING AND DISSEMINATING INFORMATION
Original Filed Feb. 17, 1933    3 Sheets-Sheet 1
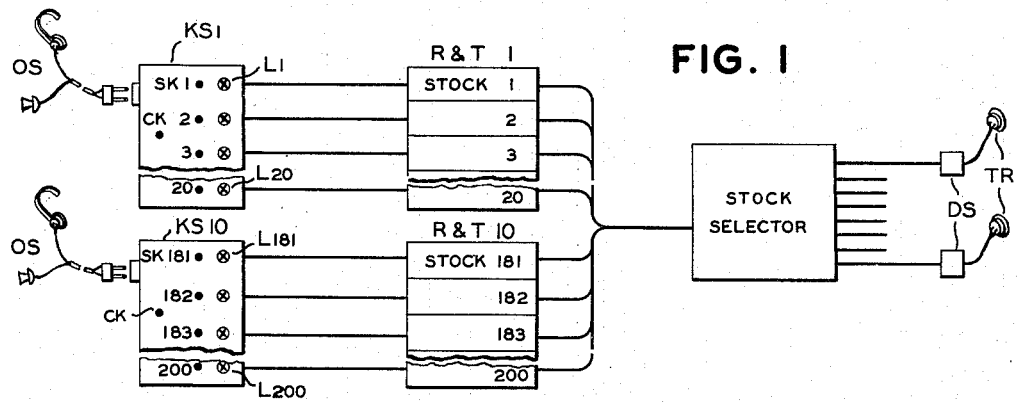
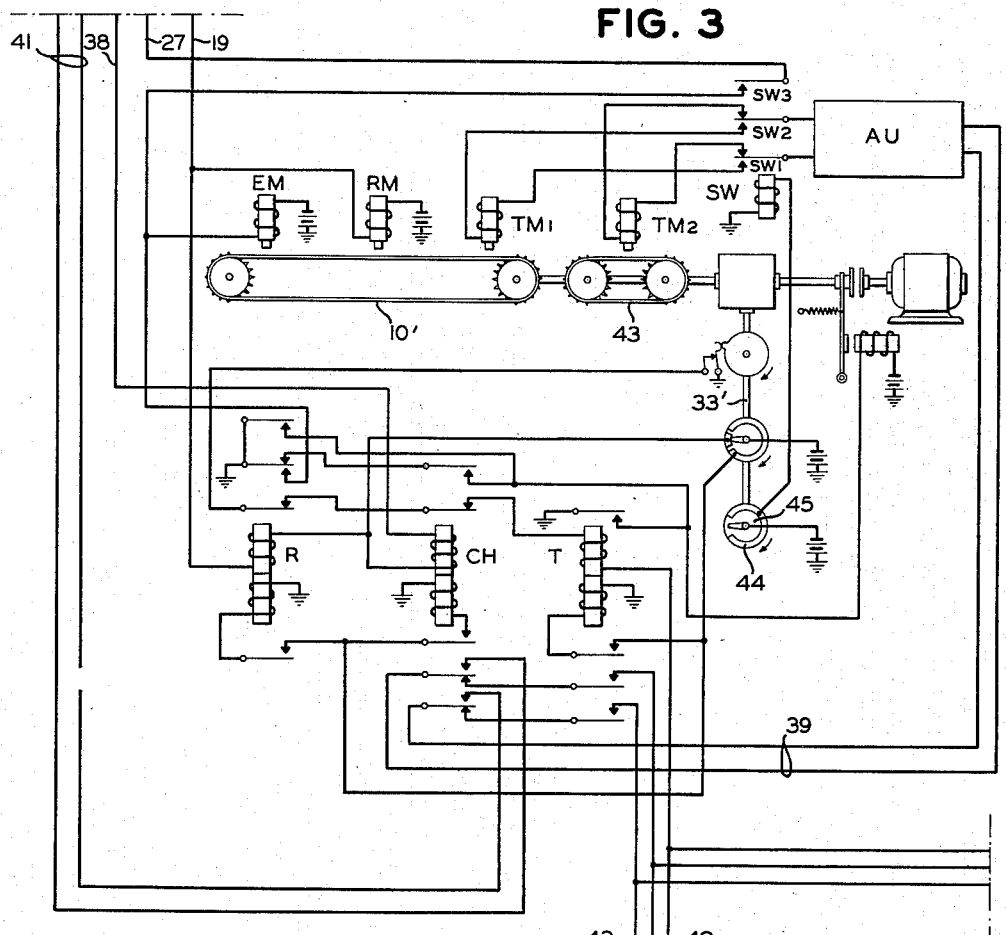
INVENTOR
RAYMOND M. HICKS
BY Marvin J Reynolds
ATTORNEY Dec. 10, 1940.   R. M. HICKS   2,224,244
METHOD OF AND APPARATUS FOR RECORDING AND DISSEMINATING INFORMATION
Original Filed Feb. 17, 1933   3 Sheets-Sheet 2
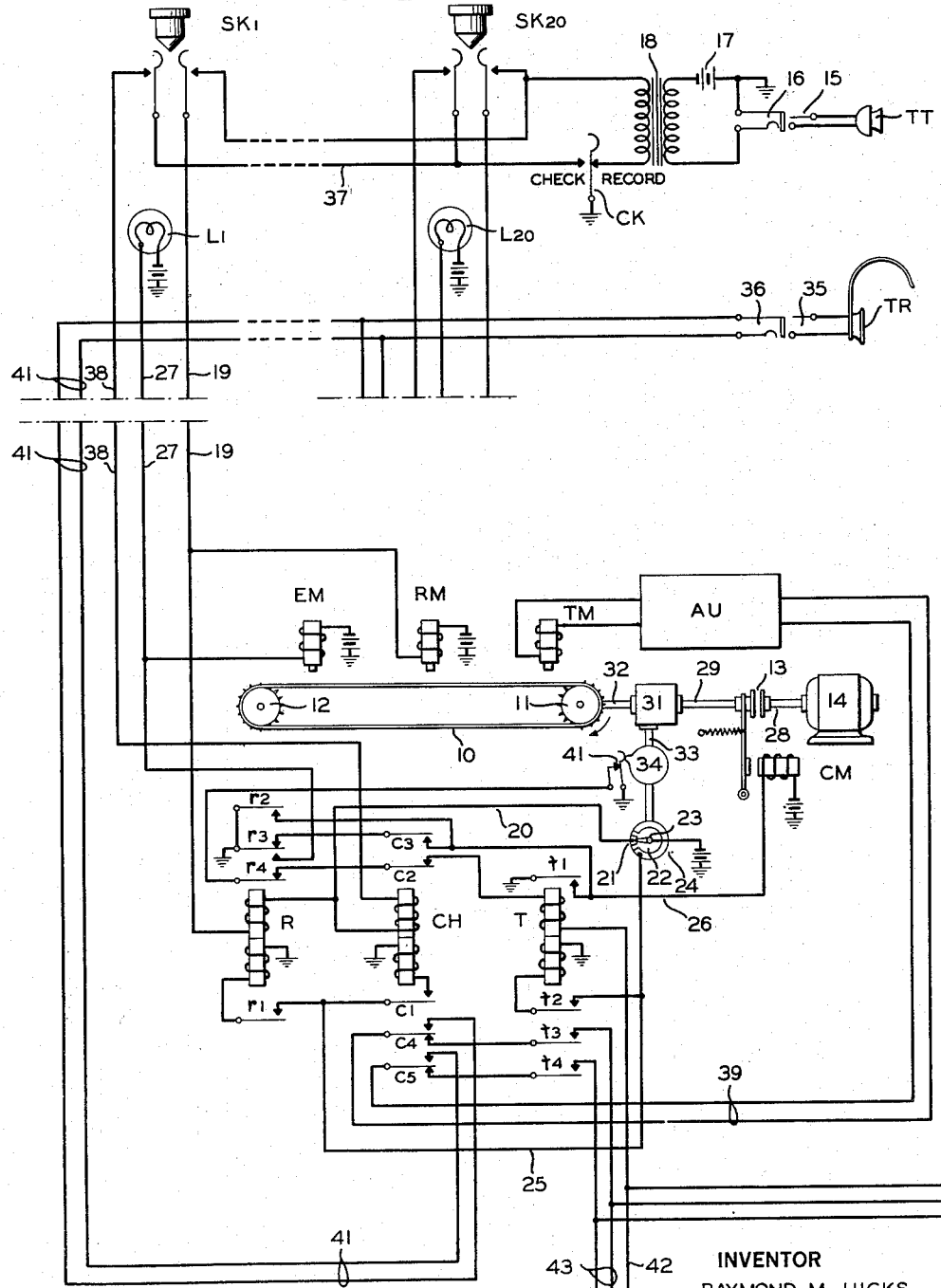
INVENTOR
RAYMOND M. HICKS Patented Dec. 10, 1940

2,224,244

UNITED STATES PATENT OFFICE 2,224,244

METHOD OF AND APPARATUS FOR RECORDING AND DISSEMINATING INFORMATION

Raymond M. Hicks, Plainfield, N. J., assignor to The Teleregister Corporation, New York, N. Y., a corporation of Delaware Application February 17, 1933, Serial No. 657,252
Renewed June 9, 1937

22 Claims. (Cl. 179—6)

This invention relates to a method of and apparatus for recording and disseminating information concerning a variety of items having changing characteristics.

It is particularly applicable to a subscribers' service for supplying the prices or other information concerning a large number of stocks, commodities, or other items and by way of example is described herein with reference to a system for supplying "bid" and "ask" prices of stocks, although it is to be understood that it is not limited to "bid" and "ask" service, the principles thereof applying to any system in which it is desired to selectively store information concerning any one of a large number of items for subsequent reproduction and repetition to a number of subscribers.

According to current practice, the various stocks in which transactions occur on the New York Stock Exchange are divided into a number of groups (seventeen at the present time) and the transactions in such stocks are carried on at posts, one of which is provided for each group of stocks. An individual operator associated with each post obtains from the traders thereat the "bid" and "ask" prices concerning each of the stocks allotted to the post. He transmits such information over a telephone disposed adjacent to the post to an operator in a "bid" and "ask" room at a distance from the floor of the exchange who records the same, either manually on a chalk board or by means of a keyboard upon electrically operated indicator dials. Since the "bid" and "ask" prices are constantly changing, it is necessary to revise the posting of these prices at frequent intervals.

Whenever a subscriber desires to obtain the "bid" and "ask" prices of a particular stock, he calls in to the board room by telephone. A large group of telephone clerks are provided to receive these requests and they orally read to the calling subscriber the prices of the desired stocks, as recorded upon the board.

It will be appreciated that in such a system there are a large number of possibilities of error. The recording operator at the board room may misunderstand a price reported by the operator at the post or he may incorrectly post the same. If a chalk board is used, the writing may not be legible and in any event the telephone clerk may incorrectly read the price to the calling subscriber. The price is read but once for each call received and consequently if the subscriber does not understand the price, it is necessary to again dial the board room. Also in case a large number of requests are received beyond the immediate capacity of the telephone clerks to respond thereto, there may be a delay in obtaining the desired information from the telephone clerks.

One of the objects of the present invention is, therefore, to eliminate this manual system and to perform a service of this nature in a manner which is largely automatic.

Another object is to reduce the time required for a subscriber to obtain the information requested and to reduce the possibility of an error in the information supplied.

Another object is to provide an improved method and apparatus for recording various characteristics or information concerning a number of items and to cause the reproduction of said characteristics or information selectively.

Another object is to enable such information to be repeated any required number of times and to be checked and varied from time to time.

Still another object is to control the recording and the reproduction of the recorded data from remote points.

A still further object is to enable any one of a plurality of subscribers to selectively reproduce and receive the recorded information one or more times and to permit two or more subscribers to obtain the same information either successively or simultaneously.

Another object is to enable the calls from each subscriber to be metered or counted.

A more specific object is the provision of means for recording by voice any desired information as to any one of a large number of items and the provision of means whereby any one of a large number of subscribers may cause the mechanism to reproduce orally the information recorded.

Another object is the provision of means whereby each one of several operators may selectively record data concerning any one of a large number of items allotted to him, together with mechanism by which any one of a large number of subscribers may reproduce and receive the information recorded by any operator in respect to any one of the various items.

Further objects of this invention consist in the arrangement of circuits and coordination of mechanisms for carrying out the principles of my invention in a satisfactory manner.

Other objects of the invention will hereinafter appear.

In accordance with a preferred embodiment of the invention I employ a phono-magnetic recording, reproducing and eradicating device in a "bid and ask" system, the mechanism being controlled from a remote point, as by an operator stationed at each of a number of posts on the floor of the exchange, in a manner to permit the "bid" and "ask" prices of any one of a plurality of stocks to be selectively recorded, eradicated by the operator automatically as an incident to the recording of a new "bid" and "ask" price of such stock, and reproduced for checking purposes by the operator. A selective system is also provided whereby any one of a large group of subscribers may, merely by dialing or otherwise calling in to the recording mechanism, selectively reproduce and receive the prices stored in the magnetic recording device. The stored prices may be repeated any required number of times to the calling subscriber during a single call or by successive calls and a new recording thereof is required only as changes occur in the "bid" and/or "ask" price of each stock.

The invention will be more fully understood by reference to the accompanying drawings in which:

Fig. 1 shows a schematic arrangement of operator's keyboards on the floor of the exchange, the recording and reproducing transmitting devices and the selection apparatus in or adjacent to the board room, and the subscriber's equipment;

Fig. 2 shows schematically a single operator's equipment and the recording and reproducing mechanism of a single item, for storing and repeating, in the case of stocks, the stock name or number, the "bid" or "ask" price or any other information relating thereto;

Fig. 3 shows a modified form of recording and reproducing mechanism, and

Figure 4:
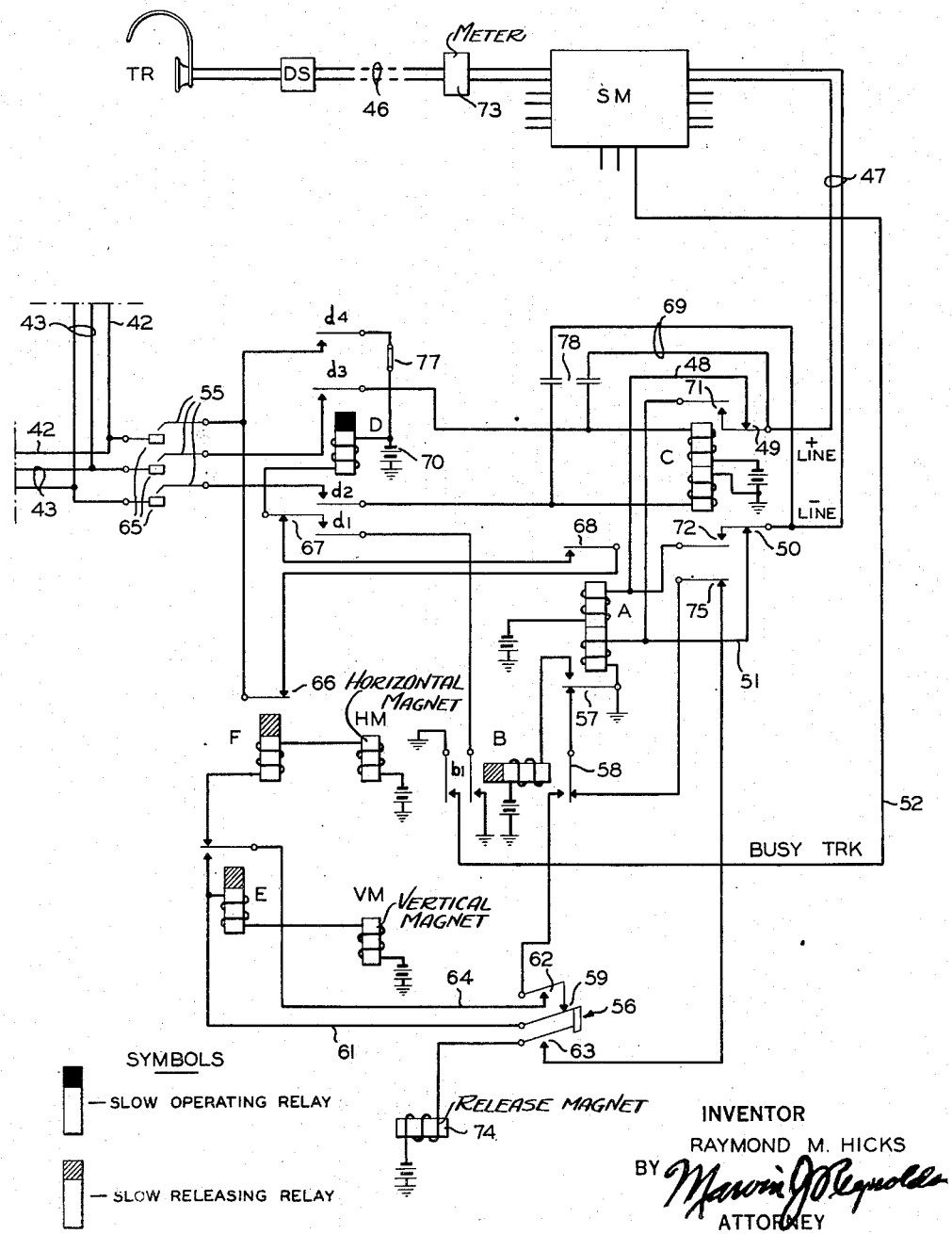
Fig. 4 shows diagrammatically the selective switching arrangement for associating the subscriber's lines with the reproducing and transmitting mechanism of an individual item.

Referring first to Fig. 1, each operator on the floor of the exchange is provided with a key set KS, each set including a stock key SK individual to each stock allotted to the particular post. Each key set is shown as having a capacity of twenty stocks but, of course, any other number of stocks may be controlled from a single key set. Each key may be suitably marked with a number or abbreviation designating the stock to which it corresponds. The keyboard also includes a series of lamps L, one for each stock, and a check key CK common to the key set which is used to permit either checking of the stored information or the recording of new prices. The operator is also provided with a telephone transmitter and receiver OS which may be detachable from the key set.

The depression of any one of the stock keys SK connects the operator's telephone set OS to the corresponding stock recording and reproducing transmitting mechanism R&T. A separate recording and reproducing mechanism is provided for each stock and these mechanisms are preferably arranged in groups corresponding to the groups of stocks allotted to the different posts.

The subscriber's equipment may consist of a telephone receiver TR and a dial set DS. By means of the dial set the subscriber's receiver may be connected, through the stock selecting apparatus, which may be of any suitable exchange type, to any one of the stock recording and reproducing mechanisms of any one of the groups thereof.

Reference will now be had to Fig. 2 in which I have shown the circuits for recording and reproducing the data concerning a single stock, in their relation to the mechanical elements of the system. The operator's apparatus comprises the telephone transmitter TT, check key CK, stock key SK for each stock allotted to the particular operator, lamp L corresponding to each stock key, and telephone receiver TR. The recording and reproducing mechanism is shown by way of specific example as including a wire or band 10 of magnetic material moved in the direction of the arrow by sprocket wheels 11 and 12 driven through the clutch 13 from an electric motor 14 although it may comprise a magnetic disk or other recording medium suitably driven. The band is provided with an eradicating magnet EM, a recording magnet RM and a transmitting reproducing magnet TM. A clutch magnet CM for controlling the movement of the magnetic storage device 10 is selectively energized by any one of the controlling relays R, CH, and T.

When the operator on the floor of the exchange inserts the plug 15 of his transmitter TT into the jack 16, talking battery 17, in series with the primary winding of a repeating coil 18, is connected to the transmitter. The operator, when about to record, should note that check key CK is in the recording or right-hand position, after which stock key SK corresponding to the first stock to be recorded, such as SK1, is depressed and held in this position. If the recording equipment is idle at this time, that is if it is not responding to a call from one of the subscribers, the associated signal lamp L1 lights steadily as a visual indication to the operator that the recording mechanism is ready to receive voice impulses. The operator may then immediately dictate the stock designation and price information after which the stock key SK1 is released. The lamp L1 remains lighted until the completion of the recording cycle.

The stock key SK1 when depressed closes a circuit from the ground at the check key CK through the secondary winding of the repeating coil 18, right-hand contact of stock key SK1 to the winding of the recording magnet RM and thence to grounded battery. A parallel circuit is also closed from the conductor 19 through operating winding of relay R and thence by lead 20 to the short segment 21 of commutator 22 and by the brush 23 to grounded battery. As soon as the brush 23 moves on to the long segment 24, as will subsequently appear, the relay R locks up over its armature r1 and conductor 25. In the normal rest position of the recording and reproducing mechanism the brush 23 rests on the segment 21 and consequently the relay R can only be energized at this time. If a call is being answered from a subscriber when the operator depresses a stock key, relay R will remain de-energized until the completion of the call and the operator will be advised thereof by the delay in the lighting of his lamp L1.

As soon as relay R picks up it completes the following circuits:

(1) It supplies ground at its operated armature r2 over conductor 26 to the clutch magnet CM.

(2) It supplies ground through its armature r3 and front contact, and conductor 27 to the signal lamp L1 to notify the operator that the recording mechanism is in condition to receive information.

(3) In parallel with the lamp L1, ground is also supplied to the eradicating magnet EM.

(4) At its armature r4 it removes ground from the winding of the relay T thus preventing any subscriber from completing the reproducing circuit during the recording process.

The energized magnet CM effects engagement of the clutch 13 to connect the motor shaft 28 to the shaft 29 which is connected through gear box 31 with the shaft 32 carrying sprocket wheel 11. Also driven through gear box 31 is a shaft 33 on which is mounted a cam 34 and the brush 23. During the resulting movement of the wire 10 the operator announces in his transmitter TT the stock and the price thereof which it is desired to store. The recording magnet RM, responding to the voice impulses, registers the same upon the magnetic wire 10 as it passes beneath the pole of the magnet, as is well understood by those versed in this art. This information must be recorded while the recording wire is making a single revolution and as soon as the operator has given the complete information he releases the key SK1 whereupon the mechanism continues to rotate until brush 23 leaves the segment 24 (thereby interrupting the locking circuit for relay R) and comes to rest upon the segment 21. During the recording process the information previously stored in the wire is eradicated by the uniform energization of the eradicating magnet EM. The release of the relay R closes the armature contact $r4$ thereby again applying ground to the winding of the subscribers' transmitting relay T and thereby making the information recorded available to either the operator or any one of the subscribers, as will presently appear.

Whenever the operator desires to check the record on the magnetic wire 10 he may do so by inserting the plug 35 of the telephone receiver TR into the jack 36, moving the check switch CK to its "checking" or left-hand side and depressing the key of the stock which he desires to check, as for instance, the key SK1. Upon depression of the stock key under this condition, it completes a circuit from ground at the check key over the conductor 37, left contact of stock key SK1, conductor 38, operating winding of the relay CH, conductor 20, and segment 21 of the commutator 22 and by the brush 23 to the grounded battery. The relay CH operates, providing the recording mechanism is in the rest position or as soon as it reaches such position, and locks up over armature C1 and conductor 25 as soon as brush 23 rotates onto segment 24.

The relay CH performs the following functions:

(1) The contact $c2$ interrupts the ground for the transmitting relay T thereby preventing a subscriber from calling in during the checking period.

(2) The contact $c3$ completes a circuit for the clutch magnet CM from ground through contact $r3$ (on its back contact at this time) of relay R, contact $c3$ and conductor 26 to the clutch magnet.

(3) At contacts $c4$ and $c5$ it connects the operator's telephone receiver TR to the conductors 39 extending from the amplifying unit Au and thence to the transmitting magnet TM.

Consequently as the wire 10 is drawn beneath the transmitting magnet TM, the data stored thereon is reproduced, amplified in the unit AU and transmitted over the conductors 39 and 41 to the operator's headset. The operator may cause this information to be repeated as many times as desired by holding the key SK1 depressed, but as soon as he has verified the record, he released the key SK1 and thereupon the mechanism comes to rest as it completes the revolution then in progress. During this reproduction it should be noted that the eradicating magnet EM is de-energized since the armature $r3$ of relay R rests on its back contact.

If at any time a subscriber desires to obtain the "bid" and "ask" price of any stock, he selects the T relay of the particular stock in reference to which he desires information. The apparatus for selecting this relay is shown in Figure 4 and will be referred to subsequently. The relay T will not operate, however, unless all other circuits are normal, that is, the reproducing unit must be in the rest position and not in use by the operator for recording or checking purposes. For this purpose the circuit for the operating winding of the magnet T is completed through the back contacts of the tongues $c2$ and $r4$ of relay CH and R respectively and through contacts 41, closed by the cam 34 only in the rest position thereof. Whenever a subscriber picks the T relay, battery is connected to the conductor 42 thereby completing the operating circuit over the path just traced to ground at the contacts 41. The relay T locks up over its contact $t2$ as soon as the brush 23 makes contact with segment 24 and performs the following functions:

(1) It applies ground through its contact $t1$ to the clutch magnet CM thereby causing the wire 10 to make one revolution.

(2) It connects the conductors 39, through its contacts $t3$ and $t4$, to the conductors 43 leading to the subscriber's telephone receiver, this circuit being completed through the armatures $c4$ and $c5$ of relay CH, which now rest on their back contacts.

Consequently as the wire 10 makes its revolution, the record thereon is reproduced, amplified and transmitted to the subscriber. As the revolution is completed, the locking circuit for relay T is interrupted by passage of the brush 23 on to the segment 21 thereby releasing the relay T and thus de-energizing the clutch magnet CM and bringing the apparatus to rest so that the mechanism is now in condition to respond to a succeeding call.

In Figure 3 I have shown a modification of the recording and reproducing system in which it is unnecessary for the operator to repeat the stock designation each time a record is made, this information being permanently recorded upon a separate magnetic wire 43 driven in unison with a second wire 10' upon which the price only is recorded. A separate transmitting magnet TM2 is provided for the wire 43, this magnet being connected to the back contacts of armatures SW1 and SW2 of relay SW. The transmitting magnet TM1 of the wire 10' has its terminals connected to the front contacts of armature SW1 and SW2 of relay SW. One terminal of this relay coil is grounded and the other is connected to a segment 44 of a second commutator 45 having its brush mounted on the shaft 33'. In the operation of this modification each time the clutch is engaged for a revolution of the brush arm 45, the wires 43 and 10' rotate simultaneously. During the first part of the rotation the relay SW is de-energized due to the break in the segment 44 and the magnet TM2 is connected through the amplifying unit to the conductors 39, thereby repeating thereover the stock designation. During the latter part of the revolution of the brush of commutator 45 the relay SW is energized, disconnecting the magnet TM2 and connecting the magnet TM1 to the amplifier for repetition of the stock price. It will be understood that the stock price is recorded on the latter portion of the wire 10' only, the active part thereof being brought into operative relation to the magnet TM1 immediately following the operation of the relay SW which occurs just as the wire 43 has made one revolution.

When changing the record on the wire 10' the operator plugs into the jack 16 (Fig. 2) and operates the check key CK and the stock key SK1 as usual. He then waits for the lamp L1 to light and as soon as this occurs, starts to dictate the stock prices. The operation of the lamp L1 is delayed in this modification (Fig. 3) until the time of operation of the switch SW so that the recording occurs on the proper portion of the wire 10'. For this purpose the circuit for the lamp L1 is completed through the front contact and tongue SW3 of the relay SW.

The circuit arrangements for operation of the system otherwise are as described with reference to Figure 2.

In Figure 4 I have shown the switching arrangement for selecting the T relay of the particular stock concerning which information is desired. Each subscriber, as previously stated, is supplied with a telephone receiver TR and a dial set DS. These are connected through a pair of conductors 46 to a central exchange, terminating thereat in the group and idle switch selecting mechanism SM.

It is contemplated with the present system that whenever a subscriber desires the "bid" and "ask" price for a stock, he will dial four digits on the dial set DS. The first two digits select the particular group to which the stock desired is allotted. As stated, this allotment ordinarily corresponds to the allotment of the stocks at the posts on the floor of the exchange. The last two digits select the particular stock in the group. Since the groups are so arranged as to have not more than one hundred stocks per group, the final stock selection may be made with two digits only.

Each group of recording and reproducing mechanism has associated therewith a sufficient number of selecting switches, which have been shown as of the Strowger or step-by-step type, to take care of the maximum number of calls to which the group may be subjected at any time.

When a subscriber calls, his line is connected through the group selector SM to the first idle switch associated with the group. In Figure 4 I have shown diagrammatically one of such switches connected by the conductors 47 to the group selector SM. The construction of the group selector may be of the type commonly used in automatic exchange systems and therefore details thereof have not been shown. Suffice it to say that in response to the first two digits of the number dialed, the subscriber's line 46 is connected through the group selector SM to the conductors 47 extending to one of the Strowger switches associated with the group of stocks selected. When this connection is made a circuit is completed from grounded battery at the relay A through the upper winding of this relay conductor 48, normal contact 49, and the positive line to the subscriber's dial set and telephone receiver, and thence back through the negative line, normal contact 50 and conductor 51 to the lower winding of the relay A and thence to ground. The A relay is thus operated closing the circuit to the slow to release B relay. This latter relay operates and completes a ground over the busy trunk 52, one of which is provided for each switch, to the group selector SM, to thus prevent this switch from being selected by a succeeding call.

The construction of the Strowger switch is well known and therefore the mechanical construction thereof has not been shown. It is provided with a vertical magnet VM which selects the horizontal row of contacts, and a horizontal magnet HM which which selects the horizontal position of the contact wipers 55. It also has a set of off-normal contacts 56, normally in the upper position as shown, but which are moved to their lower position upon the reception of the first vertical stepping impulse.

One of the Strowger switches having been selected, a subscriber transmits the third and fourth digits of the number. The first impulse of the third digit releases the armatures of relay A, supplying an impulse from the grounded armature 57 thereof through the armature 58 of the B relay (which is operated at this time), the off normal contact 59 and conductor 61 to the winding of the E relay and the vertical magnet VM in series to grounded battery, moving the wipers into the first vertical position and at the same time opening contact 59 and closing the contacts 62 and 63. As each succeeding impulse of the third digit is received, it is repeated from the armature of the A relay over the conductor 64 and the tongue of the E relay through the winding of the E relay to the vertical magnet VM, stepping the wipers successively into higher vertical positions. In the prolonged interval between the third and fourth digit, the circuit for the slow acting E relay is interrupted at the armature of the A relay permitting the E relay to release. Consequently, as the impulses of the fourth digit are received, they are repeated through the normal contact of relay E to the F relay and the horizontal magnet HM in series, to step the wipers into the correct horizontal position. The wipers 55 are shown engaging the three contacts 65 selected as the result of the vertical and horizontal movement thereof.

During the prolonged interval following the completion of the transmission of the fourth digit, the slow to release relay F, releases closing its contact 66 and completing a circuit from grounded battery 70, at the relay D, through the winding of this relay, contacts 67, make contact and armature 68 of relay A, contact 66 of relay F and upper wiper 55, terminal 65 to conductor 42 and thence to the T relay (shown in Figure 2), the circuit being completed as previously traced to ground at the contacts 41 of the cam 34. The relay D is of the slow to operate type and therefore does not complete its stroke until the relay T has had sufficient time to operate and lock up.

The relay D upon operating closes a circuit from battery 70 through switch 77 and armature $d4$ directly to upper wiper 55. It also opens the contact 67 and locks up through its tongue $d1$ to ground at the contact $b1$ of the relay B. At the same time it connects the conductors 43 through the lower pair of wipers 55, contacts $d2$ and $d3$ of relay D to the condensers 78 and thence through the conductors 69 and 47 to the subscriber's line 46.

Relay T (Fig. 2) when selected and operated as described above, causes the transmitting reproducing mechanism to complete a cycle of operation during which the record on the magnetic wire is transmitted to the subscriber. As the commutator brush shaft 33 completes its revolution and again closes contacts 41, power from the source 70 is again applied through the armature d4 to the relay T, providing the D relay (Figure 4) is still operated, thus starting a second transmitting cycle. The relay D remains operated as long as the subscriber retains the receiver off the switchhook, and therefore the record will be repeated to the subscriber as many times as he desires without a redialing operation. This does not delay the transmission of the same information to other subscribers, however, since conductors 42 and 43 are multipled to a number of Strowger switches, any of which may be selected at the same time. When the same stock is selected by a second switch, the same information is transmitted to both calling subscribers over parallel circuits.

However, in order that the apparatus may be limited to a single cycle of operation for each call, I provide a manual switch 77 (Fig. 4) in series with the armature d4 and make the relay D of the slow-acting type. Upon opening switch 77 of each Strowger switch assembly associated with those stocks to which it is desired to limit each call to a single response, the battery 70 is removed from the armature d4 and consequently at the completion of the first cycle of the transmitting apparatus, when the locking ground is removed from relay T, at the segment 24 of commutator 22, relay T releases and the apparatus comes to rest, since no other operating battery is supplied (contact 67 of relay D being open at this time).

The closing of the armatures d2 and d3 of relay D, upon completion of each dialing operation, also causes the operation of relay C, over a circuit extending from battery at the relay C through the upper winding thereof, tongue d3 and its make contact, middle wiper 55, one of the conductors 43 contact t3 of relay T, normal contact C4 of relay CH and one of the conductors 39 to the output transformer of the amplifying unit AU, thence by the other conductor 39 normal contact C5 of relay CH, contact t4 of relay T and the other conductor 43 and lower wiper 55 to tongue d2 of relay D, and thence through the lower winding of the relay C to the opposite grounded side of the battery. The operation of relay C opens the contacts 49 and 50 and closes contacts 71 and 72, thereby reversing the polarity of the battery supplied to the line 47. The purpose of this is to enable a meter 73, individual to each subscriber, to be operated thereby for recording the number of calls which each subscriber has completed.

After the subscriber has obtained the desired information, he replaces his receiver on the switch hook, thereby opening his line and releasing the relay A and by virtue thereof permitting the relay B to release, thus completing in part the circuit to the release magnet 74 to restore the switch to normal. The release of relay B opens the locking circuit for relay D which releases as its operating circuit is opened at the contacts 68 of relay A. Relay C releases as the circuit to both windings is opened at contacts d3 and d2 of relay D. The release of relay C completes the operating circuit for the release magnet 74 which operates, thereby restoring the step-by-step switch to normal. When the wiper assembly is in the normal position, the contacts 63 are opened and the release magnet 75 is deenergized.

It will be understood, since the conductors 42 and 43 are multipled to each of the Strowger switches allotted to the group to which this particular stock belongs so that two or more subscribers may select the same stock at the same time, that is, while the recording and reproducing apparatus is in the rest position (with contacts 41, Fig. 2, closed) or while it is completing a preceding call, so that each of such subscribers receives the same information simultaneously over parallel circuits, that the amplifying unit AU should have sufficient capacity to supply the necessary operating current for the maximum number of such simultaneous calls.

It should be noted that the information may be obtained immediately upon dialing the stock, or with a delay corresponding only to the completion time of a single call, a matter of a few seconds as a maximum delay, and with a very slight probability of error, since one recorded quotation (subsequently checked by the operator) suffices for a large number of calls.

If a subscriber should originate a call for a stock while the transmitting mechanism is in use by another subscriber, his call is delayed until the completion of the transmission then in progress to insure the recitation of the item characteristic before the correct prices thereof. This is accomplished by removing the operating ground for relay D at cam 41 at all times except during the normal position of this cam.

Moreover, since the recording and checking of the information concerning each stock is completed in a much shorter period than heretofore, the prices may be revised at more frequent intervals and with less haste, thus assuring greater accuracy in the information supplied.

While the principles of the invention have been described in connection with the system disclosed as to its use in "bid" and "ask" service, it is obvious that the invention is applicable to record and transmit any information, such as the activity of a stock, the number of shares sold and the price at which these shares were sold, the "open," "high," "low," and "last" and "previous close" prices of the stock, dividends declared and the rate of the dividend, increases and decreases of the number of shares of stock outstanding, exports and imports bearing on the vale of the stock, volume of sales, call money rate, and any other information which the subscribers to the service may desire. One of the recording and reproducing systems might be employed for general remarks with reference to the market.

There are various other systems to which the invention is applicable. For example, it has application in a charge account system in a store in which each clerk may be provided with a keyset for selecting various recording and reproducing mechanism, which may be allotted to different customers. If the total amount chargeable alone is desired the recording feature may be omitted. In the use of this system, however, the total amount of the charge to which the customer is entitled may be recorded on the wire allotted to his account and may be reproduced and heard by the clerk and may then be eradicated to permit recording of the balance of charge to which the customer is entitled after the amount of the sale has been deducted from his previous charge balance. If desired, each clerk may be provided with a dial set to control an exchange to connect with any one of the customers' charge account wires, which reduces the number of wires between the clerk and the room in which the charge account wires are located.

It is obvious that there are various other systems in which this general arrangement can be used for recording information which is to be made available at any one of a large number of places when desired as for instance the quotation of such race track information as "place" and "show," number of bets, betting odds, etc. and the storage and subsequent reproduction of telegraph signals.

While the invention has been described in connection with the several modifications of systems disclosed, which are adapted for the uses set forth in the description, it is to be understood that the reference to such uses shall not limit the invention thereto and that various changes may be made in the mechanism employed within the principles of this invention, and that any words of description that may be imported to the claims from the specification are not to be considered as words of limitation.

What I claim is:

1. In a system of the character described including a plurality of phono-magnetic recording devices, each individual to one of numerous items, said devices including mechanism for eradicating and recording and for reproducing records, an operator's equipment including mechanism for selectively controlling any of said devices for reproducing and transmitting information recorded thereon to the operator, means also included in the operator's equipment for selectively eradicating and recording information in respect to any item on a predetermined one of said recording devices, a plurality of subscribers' equipments, means controlled by said equipments for causing the reproduction of the information on any of said devices and transmission thereof to the calling subscriber, and means whereby said operator's equipment is operable, while said reproducing devices are in their operative positions to transmit information to a calling subscriber, for selectively changing at will the information recorded on any of said individual reproducing devices and individual to any of said items.

2. In a system of the character described including a plurality of phono-magnetic recording devices, each individual to one of numerous items, said devices including mechanism for eradicating and recording and for reproducing, an operator's equipment including mechanism for selectively controlling any of said devices for reproducing and transmitting information recorded thereon to the operator, means also included in the equipment for selectively eradicating and recording information in respect to any item on a predetermined one of said recording devices, a plurality of subscribers' equipments, means controlled by said equipments for causing the reproduction of the information on any of said devices and transmission thereof to the calling subscriber, and means for preventing the operator from eradicating information on any of said devices preparatory to the posting of new information in respect to an item during the operation of reproduction and transmission of information with respect to said item to a calling subscriber, and means whereby said operator's equipment is operable, while said reproducing devices are in their operative positions to transmit information to a calling subscriber, for selectively changing at will the information recorded on any of said individual reproducing devices and individual to any of said items.

3. In a system of the character described including a plurality of phono-magnetic recording devices, each individual to one of numerous items, said devices including mechanism for eradicating and recording and for reproducing, an operator's equipment including mechanism for selectively controlling any of said devices for reproducing and transmitting information recorded thereon to the operator, means also included in the equipment for selectively eradicating and recording information in respect to any item on a predetermined one of said recording devices, a plurality of subscribers' equipments, means controlled by said equipments for causing the reproduction of the information on any of said devices and transmission thereof to the calling subscriber, and means operated as a calling subscriber selects a device for preventing the operator from controlling said device to reproduce and transmit to the operator information on said device, and means whereby said operator's equipment is operable, while said reproducing devices are in their operative positions to transmit information to a calling subscriber, for selectively changing at will the information recorded on any of said individual reproducing devices and individual to any of said items.

4. In a system of the character described including a plurality of phono-magnetic recording devices, each individual to one of numerous items, said devices including mechanism for eradicating and recording and for reproducing, an operator's equipment including mechanism for selectively controlling any of said devices for reproducing and transmitting information recorded thereon to the operator, means also included in the equipment for selectively eradicating and recording information in respect to any item on a predetermined one of said recording devices, a plurality of subscribers' equipments, means controlled by said equipments for causing the reproduction of the information on any of said devices and transmission thereof to the calling subscriber, and means controlled upon selection of a device by the operator for preventing a subscriber from selecting such device, and means whereby said operator's equipment is operable, while said reproducing devices are in their operative positions to transmit information to a calling subscriber, for selectively changing at will the information recorded on any of said individual reproducing devices and individual to any of said items.

5. In a system for disseminating information regarding a plurality of different items, a plurality of voice storing and reproducing devices each individual to one of said items, a plurality of subscribers' lines, a selecting mechanism controlled over said lines for selectively associating any of said lines with any one of said voice reproducing devices, means also controlled over said lines for causing the record stored on the selected one of said devices to be reproduced and transmitted over said associated line, and means for selectively changing at will the information stored on any of the individual reproducing devices while the devices are in their operative positions in the system.

6. In a system for disseminating information regarding a plurality of different items, a plurality of voice storing and reproducing devices each individual to one of said items, a plurality of subscribers' lines, a selecting mechanism controlled over said lines for selectively associating one or more of said lines with any selected one of said voice reproducing devices, means for causing the record stored on the selected one of said devices to be reproduced and transmitted simultaneously over each of said associated lines, and means for selectively changing at will the information stored on any of the individual reproducing devices while the devices are in their operative positions in the system.

7. In a system for disseminating information regarding a plurality of different items, a plurality of voice storing and reproducing devices each individual to one of said items, a plurality of subscribers' lines, a selecting mechanism controlled over said lines for selectively associating any of said lines with any one of said voice reproducing devices, means also controlled over said lines for causing the record stored on the selected one of said devices to be reproduced and transmitted one or more times over said associated line, and means for selectively changing at will the information stored on any of the individual reproducing devices while the devices are in their operative positions in the system.

8. In a system for disseminating information regarding a plurality of different items, a plurality of voice storing and reproducing devices each individual to one of said items, a plurality of subscribers' lines, a selecting mechanism controlled over said lines for selectively connecting any of said lines with any of said voice reproducing devices, means for causing the selected one of said devices to complete a cycle of operation whereby the record thereon is reproduced and transmitted over said associated line, means for operating said selecting mechanism to prepare said connection while the voice storing device is responding to a preceding call, means for completing said connection after said device has completed its preceding cycle of operation, and means for selectively changing at will the information stored on any of the individual reproducing devices while the devices are in their operative positions in the system.

9. In a system for disseminating information regarding a plurality of different items, a plurality of voice storing and reproducing devices each individual to one of said items normally in a rest position, means for moving said device from said rest position through a cycle of operation whereby the record stored thereon is reproduced, a plurality of lines, a selecting mechanism for connecting any of said lines to any of said devices to receive the record reproduced thereby, means for preventing said connection except when said device is in its rest position, and means for selectively changing at will the information stored on any of the individual reproducing devices while the devices are in their operative positions in the system.

10. In a system for disseminating information regarding a plurality of different items, a plurality of voice storing and reproducing devices each individual to one of said items normally in a rest position, means for moving said device from said rest position through a cycle of operation whereby the record stored thereon is reproduced, a plurality of calling lines, a selecting mechanism operable over said lines for selectively connecting any of said lines to any of said devices to receive the record reproduced thereby, means for completing said connection only when said device is in its rest position, means for limiting said device to a single cycle of operation for each connection so made, and means for selectively changing at will the information stored on any of the individual reproducing devices while the devices are in their operative positions in the system.

11. In a system for disseminating information regarding a plurality of different items, a plurality of voice storing and reproducing devices each individual to one of said items and each normally in a rest position, means for moving said devices from said rest position through a cycle of operation whereby the record thereon is reproduced, a line, a selecting mechanism for connecting said line to any of said devices to receive the record reproduced thereby, means for preventing said connection except when said selected device is in its rest position, and means for selectively changing at will the information stored on any of the individual reproducing devices while the devices are in their operative positions in the system.

12. In a system for disseminating information regarding a plurality of different items, a plurality of voice storing and reproducing devices each individual to one of said items, a selecting mechanism for permitting information to be stored on any of said devices, a reproducing means for each of said devices, selective mechanism remotely controlled to cause the information stored on any of said devices to be reproduced and transmitted over a selected channel, and means, operable while said reproducing devices are in their operative positions to transmit said information, for selectively changing at will the information stored on any of said reproducing devices.

13. In a system for disseminating information regarding a plurality of different items, a plurality of voice storing and reproducing devices each individual to one of said items, a plurality of communication channels associated with said devices, means at the terminal of each of said channels for selectively reproducing the record on any of said devices, over the channel, and means at one of said terminals for varying the record on any of said devices while said devices are in their operative positions to transmit said record over said communication channels.

14. In a system for disseminating information regarding a plurality of different items, a plurality of voice recording and reproducing devices each individual to one of said items, a plurality of communication channels, selective means for associating any channel with any one of said recording and reproducing devices, means controlled over said channel for causing the record on said associated device to be repeated thereover and means controlled over certain of said channels for eradicating the record on the associated device and producing a new voice record thereon.

15. In a system for disseminating information regarding a plurality of different items, a plurality of voice recording and reproducing devices each individual to one of said items, a plurality of communication channels, selecting mechanism for associating any one or more of said channels with any one of said recording and reproducing devices, means controlled over said channel or channels for causing the record on the associated device to be repeated thereover and means controlled over certain of said channels for revising the record on the associated device.

16. In a system of the character described including a plurality of phono-magnetic recording devices, each individual to one of numerous items, said devices including mechanism for eradicating and recording and for reproducing, an operator's equipment including mechanism for selectively controlling any of said devices for reproducing and transmitting information recorded thereon to the operator, means also included in the equipment for selectively eradicating and recording information in respect to any item on a predetermined one of said recording devices, a plurality of subscribers' equipments, means controlled by said equipments for causing the reproduction of the information on any of said devices and transmission thereof to the calling subscriber, means for preventing the operator from eradicating information on any of said devices preparatory to the posting of new information in respect to an item during the operation of reproduction and transmission of information with respect to said item to a calling subscriber, and signal means operative to indicate to the operator an idle condition of each of said recording devices.

17. In a system of the character described including a plurality of electro-responsive recording devices, each individual to one of numerous items, said devices including mechanism for eradicating and recording and for reproducing, an operator's equipment including mechanism for selectively controlling any of said devices for reproducing and transmitting information recorded thereon to the operator, means also included in the equipment for selectively eradicating and recording information in respect to any item on a predetermined one of said recording devices, a plurality of subscribers' equipments, means controlled by said equipments for causing the reproduction of the information on any of said devices and transmission thereof to the calling subscriber, means for preventing the operator from eradicating information on any of said devices preparatory to the posting of new information in respect to an item during the operation of reproduction and transmission of information with respect to said item to a calling subscriber, and signal means operative to indicate to the operator an idle condition of each of said recording devices.

18. In a system of the character described including a plurality of recording devices, each individual to one of numerous items, said devices including mechanism for eradicating and recording and for reproducing, an operator's equipment including mechanism for selectively eradicating and recording information in respect to any item on a predetermined one of said recording devices, a plurality of subscribers' equipments, means controlled by said equipments for causing the reproduction of the information on any of said devices and transmission thereof to the calling subscriber, means for preventing the operator from eradicating information on any of said devices preparatory to the posting of new information in respect to an item during the operation of reproduction and transmission of information with respect to said item to a calling subscriber.

19. A system for disseminating information regarding a plurality of stocks or other items, comprising a plurality of subscribers' stations, a plurality of voice recording and reproducing devices each individual to one of said items, means controlled by any one of said subscribers' stations for selecting any one of said devices for operation and for operatively connecting the calling subscriber's station with the selected recording and reproducing device, means for causing the selected one of said devices to transmit the item information to the subscriber's station, and means for preventing the completion of a connection from a calling subscriber to the selected device during the time that said item information is being transmitted by said device to another subscriber.

20. A system for disseminating information regarding a plurality of different items, comprising a plurality of communication channels, a plurality of voice reproducing devices each individual to one of said items and having a rest position and an operating position, mechanism controlled by any of said channels for selectively connecting said devices to the channels, and means for preventing the completion of said connection except when the selected device is in its rest position.

21. In a system of the character described, a plurality of recording devices for storing information in respect to a plurality of stocks or other items, an operator's equipment operatively associated with said devices for selectively changing the information stored thereon, a plurality of subscribers' equipments, means controlled by said subscribers' equipments for causing the reproduction of the information stored on any one of said devices and transmission thereof to a calling subscriber, means for preventing the operator from changing the information stored on any of said devices preparatory to the storing of new information in respect to an item during reproduction and transmission of information in respect to said items to a calling subscriber, means for transmitting the information stored on any of said devices to the operator to verify the correctness of the stored information, and means for preventing the completion of a connection from a calling subscriber to any of said storage devices when said operator is changing and verifying the information stored on the selected device.

22. In a machine of the class described, the combination of a plurality of groups of devices for representing records, a dialing mechanism, and means under control of said dialing mechanism for transmitting a series of electrical impulses to select a particular group of devices.

RAYMOND M. HICKS.